United States Patent
Forsman et al.

(10) Patent No.: US 9,912,629 B2
(45) Date of Patent: Mar. 6, 2018

(54) METHOD FOR ACCESSING LOCAL SERVICES IN WLANS

(71) Applicant: Telefonaktiebolaget L M Ericsson (publ), Stockholm (SE)

(72) Inventors: Mats Forsman, Rönninge (SE); Tomas Thyni, Järfälla (SE); Per-Ola Andersson, Saltsjöbaden (SE); Annikki Welin, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 40 days.

(21) Appl. No.: 14/407,037

(22) PCT Filed: Feb. 24, 2014

(86) PCT No.: PCT/SE2014/050226
§ 371 (c)(1),
(2) Date: Dec. 10, 2014

(87) PCT Pub. No.: WO2015/126300
PCT Pub. Date: Aug. 27, 2015

(65) Prior Publication Data
US 2016/0219014 A1    Jul. 28, 2016

(51) Int. Cl.
*H04L 29/12* (2006.01)
*H04W 12/06* (2009.01)
(Continued)

(52) U.S. Cl.
CPC ...... *H04L 61/1511* (2013.01); *H04L 61/2007* (2013.01); *H04L 61/256* (2013.01);
(Continued)

(58) Field of Classification Search
CPC ...... H04L 69/167; H04L 63/105; H04L 69/16
See application file for complete search history.

(56) References Cited

U.S. PATENT DOCUMENTS

| 7,693,108 B2 | 4/2010 | Qi |
| 2009/0165091 A1* | 6/2009 | Liang ............ H04L 69/167 726/3 |

(Continued)

FOREIGN PATENT DOCUMENTS

RU    2411658 C2    2/2011

OTHER PUBLICATIONS

Cheshire et al., "Multicast DNS", Internet Engineering Task Force (IETF), Request for Comments: 6762, Category: Standards Track, ISSN: 2070-1721, Feb. 2013, 70 pp.

(Continued)

*Primary Examiner* — Yemane Mesfin
*Assistant Examiner* — Henry Baron
(74) *Attorney, Agent, or Firm* — Sage Patent Group

(57) ABSTRACT

A network node enables a wireless device to communicate with a local service device, such as a printer or a projector, of a Local Area Network (LAN) or Wireless Local Area Network (WLAN). The network node is connected both to a communication network and to the LAN or WLAN. The method includes identifying a multicast Domain Name System (mDNS) request, where the mDNS request is received from the wireless device, and assigning a Link-Local (LL)-address for the wireless device. The method retrieves a local IP-address of an Authentication and Authorization Service (AA-S) having authorization information regarding a local service device, and authenticates, with the AA-S which type of services, that the wireless device is authorized to use. A local IP-address of the local service device is retrieved, and service data is conveyed between the wireless device and the local service device, by applying the LL-address of the local service device.

21 Claims, 7 Drawing Sheets

(51) Int. Cl.
*H04W 4/06* (2009.01)
*H04L 29/08* (2006.01)
*H04L 12/18* (2006.01)
*H04W 80/04* (2009.01)
*H04W 84/12* (2009.01)

(52) U.S. Cl.
CPC .......... *H04L 61/3075* (2013.01); *H04L 67/02* (2013.01); *H04W 4/06* (2013.01); *H04W 12/06* (2013.01); *H04L 12/189* (2013.01); *H04L 61/1541* (2013.01); *H04L 61/2038* (2013.01); *H04L 61/2514* (2013.01); *H04W 80/04* (2013.01); *H04W 84/12* (2013.01)

(56) References Cited

U.S. PATENT DOCUMENTS

| | | | |
|---|---|---|---|
| 2010/0125899 | A1 | 5/2010 | Tinnakornsrisuphap et al. |
| 2011/0128908 | A1* | 6/2011 | Lee .................. H04L 29/06 370/328 |
| 2014/0059594 | A1* | 2/2014 | Stein .................. H04N 21/6405 725/33 |
| 2015/0222474 | A1* | 8/2015 | Hartley ............. H04L 29/08648 370/338 |
| 2016/0248596 | A1* | 8/2016 | Beaudet ............. H04L 61/1511 |

OTHER PUBLICATIONS

Williams, "Requirements for Automatic Configuration of IP Hosts", Zero Configuration Networking, Internet-Draft, Sep. 19, 2002, 22 pp.

3GPP TR 23.829 V10.0.1 $3^{rd}$ Generation Partnership Project; Technical Specification Group Services and System Aspects; Local IP Access and Selected IP Traffic Offload (LIPA-SIPTO) (Release 10) (44 pages) (Oct. 2011).

3GPP TSG SA WG2, Meeting #79 "LIPA, Multicast and Service Discovery" (8 pages) (May 10-14, 2010).

International Preliminary Report on Patentability corresponding to International Patent Application No. PCT/SE2014/050226 (16 pages) (dated Mar. 17, 2016).

International Search Report and the Written Opinion of the International Searching Authority corresponding to International Patent Application No. PCT/SE2014/050226 (12 pages) (dated Nov. 10, 2014).

Hartley et al., "Service Discovery System", U.S. Appl. No. 61/936,830, filed Feb. 6, 2014.

English-Language Official Action, RU 2016134045/07, dated Jul. 28, 2017, 4 pages.

* cited by examiner

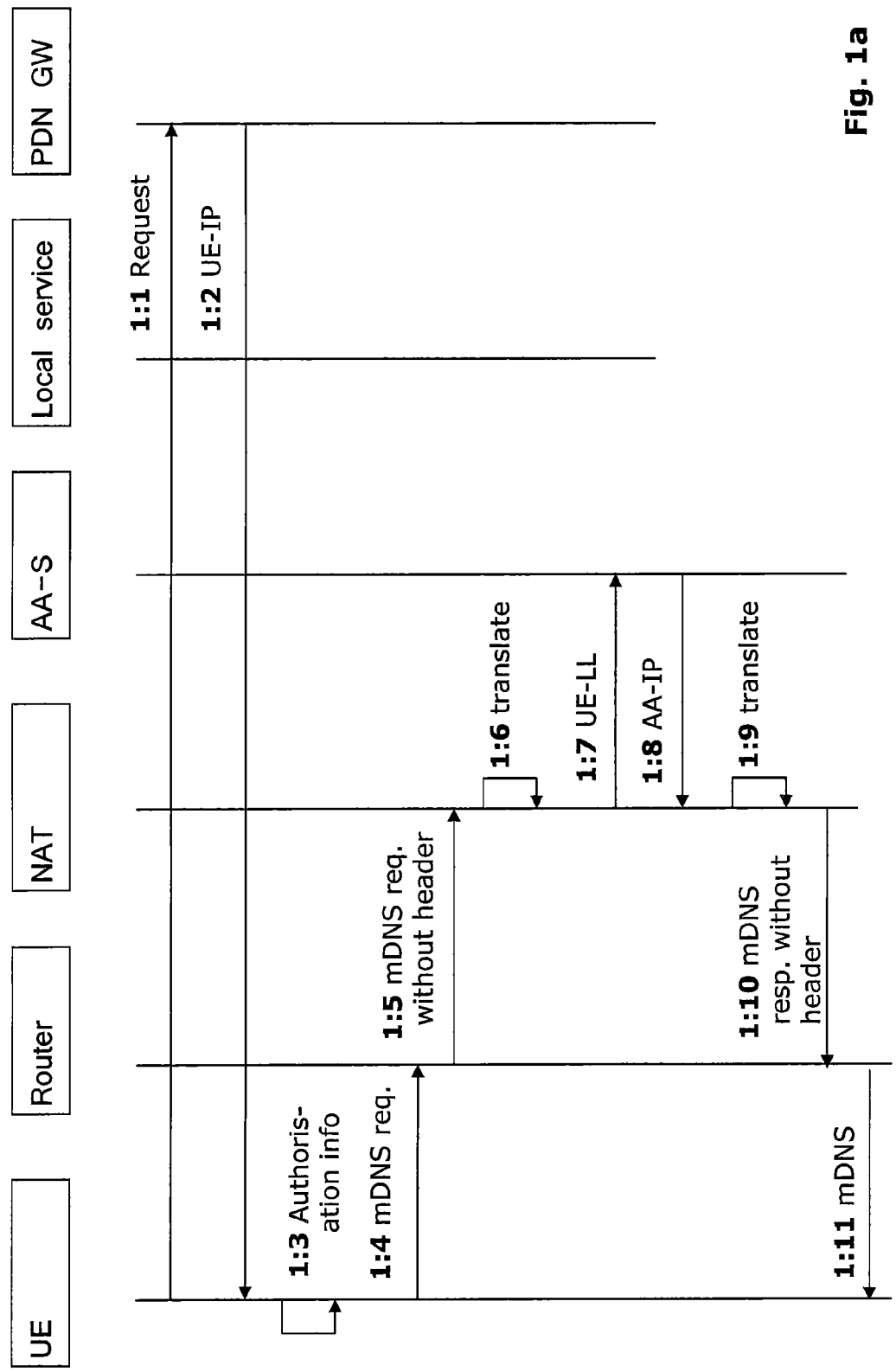

METHOD FOR ACCESSING LOCAL SERVICES IN WLANS

CROSS REFERENCE TO RELATED APPLICATION

This application is a 35 U.S.C. § 371 national stage application of PCT International Application No. PCT/SE2014/050226, filed on 24 Feb. 2014, the disclosure and content of which is incorporated by reference herein in its entirety.

TECHNICAL FIELD

The present disclosure relates to management of access to local service devices in LANs (local area networks), especially it relates to methods and arrangements for handling end users' access to local service devices in visited LANs.

BACKGROUND

Wi-Fi as connection technology is becoming more and more important; many new gadgets are equipped with Wi-Fi chip-set to enable connection and usages of different equipment together. As an example of equipment that has Wi-Fi are projectors, cameras, videos and printers.

Apple's implementation of zero configurations is using Bonjour to service discovery, address assignment and host resolutions. Bonjour locates devices such as printers, other computers, and the services that those devices offer on a local area network by using multicast Domain Name System (mDNS) service records and Ethernet as transport, using IP with link-local address in the local domain. Universal Plug and Play (UPnP) is a similar solution that permits network devices, such as PC, printers and Internet gateways, Wi-Fi access point discover each other's for data shearing.

The term "wireless communication device" will be used throughout this description to denote any device which is capable of wireless communications. The term wireless communication device may thus include any device, which may be used by a user for wireless communications. Accordingly, the term wireless communication device may alternatively be referred to as a mobile terminal, a terminal, a user terminal (UT), a user equipment (UE), a wireless terminal, a wireless communication device, a wireless transmit/receive unit (WTRU), a mobile phone, a cell phone, a table computer, a smart phone, etc. Yet further, the term wireless communication device includes MTC (Machine Type Communication) devices, which do not necessarily involve human interaction. MTC devices are sometimes referred to as Machine-to-Machine (M2M) devices.

In office buildings so called small cells or distributed antenna systems (DAS) are often arranged to provide increased access to UEs in cellular communication networks. For instance, the small cells may be implemented as pico or femto cells. Furthermore, internal data communication in office buildings are typically offered to employees and facilities, e.g. conference rooms, by LANs (Local Area Networks). It is common to provide LAN functionality wirelessly by WLANs (Wireless LANs).

UEs and other apparatuses as personal computers, printers, projectors, etc., are allowed to communicate data within the LANs which they are registered in. When connecting to a WLAN, users of UEs and other apparatuses enters a password before being authenticated by an AP (Access Point) of the WLAN.

WLANs are often referred to as Wi-Fi networks. Wi-Fi is a trademark name, and was stated to be a play on the audio term Hi-Fi (High-Fidelity). The Wi-Fi Alliance defines Wi-Fi as any WLAN products that are based on the IEEE (Institute of Electrical and Electronics Engineers) 802.11 standards. However, since most modern WLANs are based on these standards, the term "Wi-Fi" is used in general English as a synonym for "WLAN".

There are no solutions for 3GPP (3rd Generation Partnership Project) device belonging 3GPP network to co-operate and use services at Local Area Networks at IP (Internet Protocol) level. Since the IP-address is obtained from the HSS (Home Subscriber Server) or DHCP (Dynamic Host Configuration Protocol) server belonging to an operator, received at the core network and using the GTP-U tunnels, which end-point is terminated at PDN-GW, this makes 3GPP devices live in separate networks, at IP-address level. No connection for the network that is local at the moment for the user. The 3GPP solution using LIPA (Local IP Access) or SIPTO (Selected Internet IP Traffic Offload) is to use a special local PDN-GW (Packet Data Network GateWay) with a separate APN for the local traffic. The local APN (Access Point Name) is owned and controlled by the mobile operator and controls what is accessible locally. At the same time the local PDN-GW requires several mobile core network interfaces, and this makes the solution complex. Providers of WLANs (Wireless Local Area Networks) often offer access to their WLANs to get access to the Internet. Access may be offered both with and without entering a password.

However, unregistered end users are not allowed to use local resources of the WLANs. For instance, a guest who visits an office will be able to connect to the Internet via a WLAN, such as a Wi-Fi network at the office, but will not be able to use WLAN connected apparatuses, such as projectors, printers, etc.

There is a need to devise a flexible and convenient method to enable end users to get access to installed local service devices in LANs.

SUMMARY

It would be desirable to obtain improved performance in local area network for visiting end users. It is an object of this disclosure to address at least any of the issues outlined above.

Further, it is an object to temporarily provide end users with access to local service devices of local area networks. These objects may be met by a method and an arrangement according to the attached independent claims.

According to one aspect, a method performed by a communication network node of enabling a wireless communication device to communicate with a local service device, such as a printer or a projector, of a Local Area Network (LAN) or Wireless Local Area Network (WLAN), is provided. The communication network node is connected both to a communication network and to the LAN or WLAN. The method comprises identifying (200) a multicast Domain Name System (mDNS) request, wherein the mDNS request being received from the wireless communication device, and assigning (202) a LinkLocal (LL)-address for the wireless communication device.

The method comprises also retrieving (204) a local IP-address of an Authentication and Authorisation Service (AA-S) having authorisation information regarding a local service device, and authenticating (206) with the AA-S which type of services that the wireless communication device is authorised to use. Moreover, the method comprises, retrieving (208) a local IP-address of the local service device, and conveying (210) service data between the wireless communication device and the local service device, by applying the LL-address of the local service device.

Furthermore, the method may be performed for a plurality of local area network devices, e.g. an end user may be authorised to use local area printers within a building which he/she visits. Retrieving the local IP-address of the AA-S may comprise translating an original IP-address of the wireless communication device into the LL-address of the wireless communication device, forwarding the mDNS request to the AA-S, receiving the local IP-address of the AA-S, translating the local IP-address of the AA-S into an LL-address of the AA-S, and sending the LL-address of the AA-S to the wireless communication device as an mDNS response. The LL-address of the AA-S may also be sent to the wireless communication device as a Unicast DNS response.

According to another aspect, a communication network node is provided, which is adapted to enable a wireless communication device to communicate with a local service device, such as a printer or a projector, of a LAN or WLAN. The communication network node is connected both to a communication network and to the LAN or WLAN. The communication network node comprises a controller and a communication module. The communication module is adapted to convey data between a wireless communication device and a gateway of a communication network, and further adapted to convey service data between the wireless communication device and the LAN or WLAN. The controller is adapted to identify an mDNS request when received from the wireless communication device, assign an LL-address for the wireless communication device and retrieve a local IP-address of an AA-S having information regarding the local service device. The controller is further adapted to authenticate with the AA-S which type of services that the wireless communication device is authorised to use, retrieve a local IP-address of the local service device, and convey service data between wireless communication device and the local service device, by applying the LL-address of the local service device.

The defined solution may enable 3GPP devices to attach to other Local Area devices, such as printers, projectors and other services that Local Area Networks offers. The control on what can be accessed may be performed locally without additional demands on the mobile operator or core network.

BRIEF DESCRIPTION OF DRAWINGS

The solution will now be described in more detail by means of exemplary embodiments and with reference to the accompanying drawings, in which:

FIGS. 1a-d are schematic signalling charts of a scenario in a router, according to possible embodiments.

DETAILED DESCRIPTION

Figure 1B:
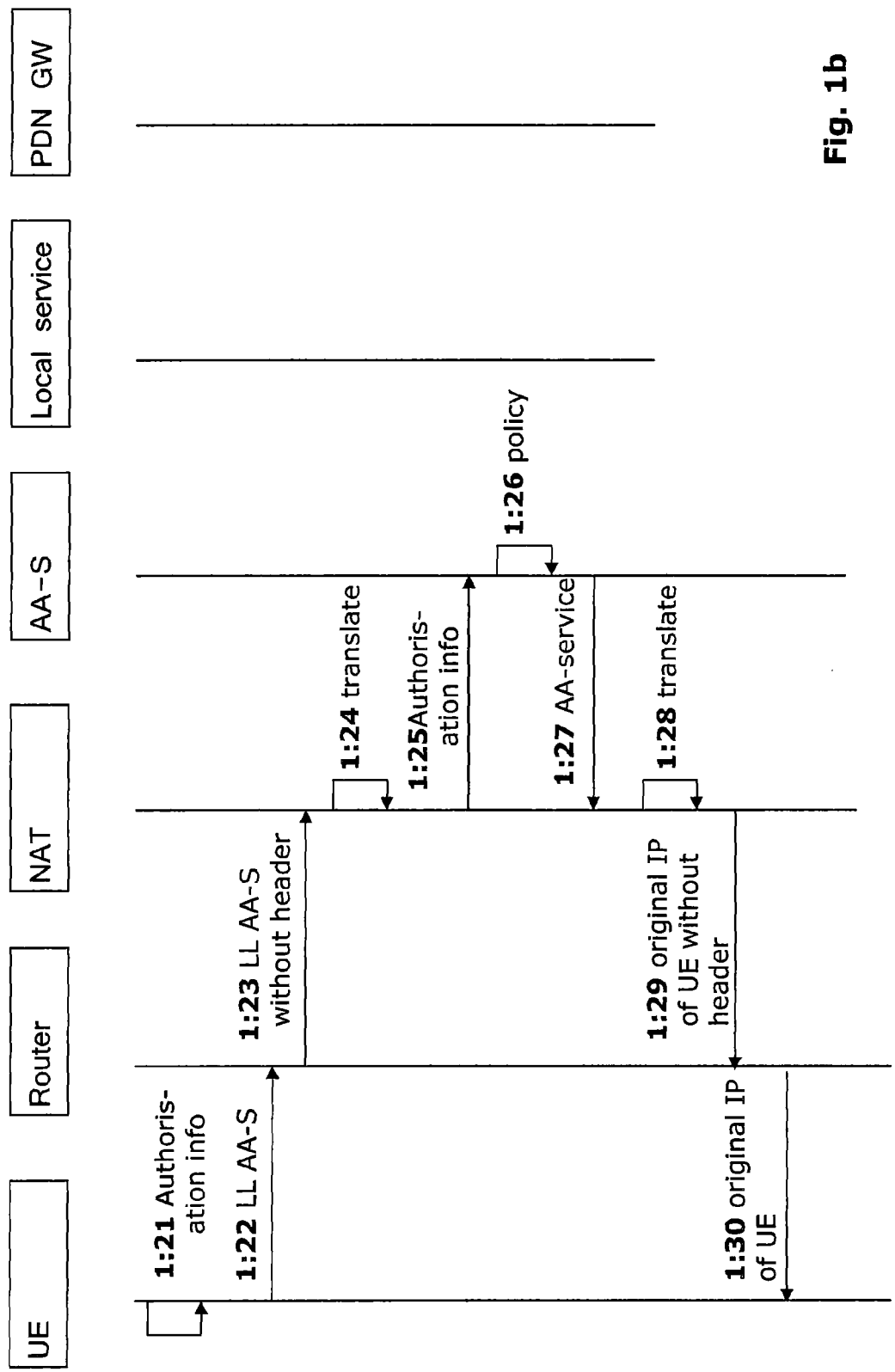

By assigning a wireless communication device, e.g. a UE, an LL (LinkLocal) address in a WLAN or LAN, and provide authorisation information to an AA-S (Authorisation and Authentication Server of the WLAN or LAN, the UE will be enabled to get access and use local service devices of the WLAN or LAN. The AA-S assigns respective LL-addresses of the local service devices, such that a router of the WLAN or LAN can translate LL-addresses of local service devices into local IP-addresses in the WLAN or LAN, and translate the LL-address of the wireless communication device into the IP-address of the wireless communication device. Thereby, by translating the LL-addresses in the router, it is enabled to convey service data between the wireless communication device and the local service devices.

In the exemplifying embodiments of this description, so called "LinkLocal addresses" are applied. LinkLocal addresses are a specific instance of IP-addresses, which only exists locally. For IPv4 LinkLocal addresses starts with the number 169.254/16, and fe80::/10 for IPv6. For instance, a LinkLocal address could be "169.254.2.5". When a router identifies a LinkLocal address in a header of an IP-packet, it knows that this IP-packet will not be routed further, and will instead handle the packet locally.

Furthermore, within this description so called "mDNS requests" and "mDNS responses" will be described. mDNS requests and responses use IPv4-addresses with the number 224.0.0.251, and FF02::FB for IPv6. When identifying an mDNS request the router knows that it will be multicasted within the local network. Local devices of the local network answers to the mDNS request with mDNS responses, when appropriate. The use of LinkLocal addresses overcomes the possible conflict with overlapping IP-addresses since LinkLocal addresses are only allowed to exist in a local broadcast domain and can therefore not be used on a wider scale in an IP network. If private IP-addresses was used there is no guaranteed that the IP address/address-range is not already used somewhere else in the operator domain. The use of LL addresses also makes it possible to avoid Port Address Translation (PAT), since every device gets a unique LinkLocal address during the Network Address Translation (NAT).

With reference to the FIGS. 1a-d, which are schematic signalling diagrams, a scenario where a wireless communication device accesses local resources of a WLAN will now be described, in accordance with one exemplifying embodiment.

In this embodiment, the wireless communication unit is a UE which is connected to a communication network, such as a UMTS (Universal Mobile Telecommunication System), HSPA (High Speed Packet Access) or an LTE (Long Term Evolution) network. As described above in conjunction with another exemplifying embodiment, a guest who visits an office building may have to access local service devices in the office building, for instance network printers. In this embodiment the end user will print a presentation on a specific network printer.

The FIG. 1a illustrates a first part of the scenario of accessing the network printer, i.e. a part where the UE will get information regarding an Authorisation and Authentication server (AA-S), i.e. a LinkLocal address to use for accessing the AA-S.

In a first action 1:1, the requests an IP (Internet Protocol)-address from an operator. The tablet computer is connected via a GTP (GPRS (General Packet Radio Service) Transport Protocol) tunnel. In response to the UE receives the IP-address, in a following action 1:2.

In a next action 1:3, an end user of the UE scans an authorisation code, which he/she has received. For instance, the authorisation code may be a QR (Quick Response code, which defines a URL (Universal Resource Link) to a server which comprises authorisation information regarding end users. However, the disclosed concept is not limited to QR codes and URL specifically. A designer may select any other suitable type of authorisation code and definition of server when appropriate, e.g. a bar code, an OCR number, and an IP-address.

An example of URL is "http://quest-service.company.com.local/guest_name %20guest-authentication %20guest-authorization %20% guest-access-time"

The URL will be further discussed below.

In a following action 1:4, because the domain name ends with ".local", the UE sends the first part (http://quest-service.company.com) of the URL with an mDNS (multicast Domain Name Service) request into the GTP tunnel. In another action 1:5, the router which observes the traffic in the GTP tunnel identifies the mDNS request and routes it locally in the WLAN, which it controls. The router removes the GTP-U header of the IP-packets of the mDNS request and routes the mDNS request further to a NAT (Network Address Translator) of the router.

In another action 1:6, the NAT assigns an LL (LinkLocal)-address to the UE and controls that the LL-address is not already used. Then, the NAT translates the UE's original IP-address into the UE's assigned LL-address. In a subsequent action 1:7 the UE's assigned LL-address is sent with an mDNS request into the WLAN.

In a following action 1:8, an AA-S (Authorisation and Authentication) of the WLAN, which is aware of authorisation information of the WLAN, answers the mDNS request with an mDNS response comprising the local IP-address AA-IP of the AA-S. It is to be noted that the mDNS also may comprise an appropriate port number of the AA-S, e.g. in accordance with TCP (Transmission Control Protocol) or UDP (User Datagram Protocol).

The NAT translates the AA-S's local IP-address into an LL-address of the AA-S, in a following action 1:9, and sends LL-address of the AA-S to the router with an mDNS response, in a following action 1:10.

When the router receives mDNS response, in a following action 1:11, the mDNS response does not comprise any GTP-U header, and the router attaches then the GTP-U header and routes the mDNS response to the UE.

When the router knows how to access the AA-S, the router may authenticate the end user and the UE with the AA-S.

The FIG. 1b illustrates a second part of the scenario of accessing the network printer, i.e. a part where the UE will be authorised to a local service device.

In a first action 1:21, the UE makes use of the second part of the URL read in action 1:3, i.e. the part "guest_name %20guest-authentication %20guest-authorization %20% guest-access-time". The UE sends the second part of the URL into the GTP tunnel addressed to the LL of the AA-S, in a following action 1:22.

In another action 1:23, the router which observes the traffic in the GTP tunnel identifies LL-addressed IP-packets, i.e. the second part of the URL, and routes it locally in the WLAN. Correspondingly, to the action 1:5, the router further removes the GTP-U header of the IP-packets before routing them to the NAT (Network Address Translator) of the router.

Then, in another action 1:24, the NAT translates the LL-address of the AA-S into the local IP-address of the AA-S, and the IP-packets from the UE, i.e. the second part of the authorisation information, are sent to the AA-S, in another action 1:25.

In a following action 1:26, the AA-S determines an authorisation policy for the UE, based on the received authorisation information. In this embodiment, the authorisation information comprises the guest name, the guests authentication, e.g. that the guest has indentified himself/herself at the reception desk, the guests authorisation, e.g. that the guest has access to network printers in the WLAN, and an access time for the guest to the service.

In another action 1:27, the AA-S responds with information regarding which local service, i.e. network printers, the UE is authorised to use, by sending the information to the NAT, addressed to the LL-address of the UE. The NAT translates the LL-address of the UE into the original IP-address of the UE, in a following action 1:28, and sends the information without GTP-U header to the router in another action 1:29.

When the router receives the information, in a following action 1:30, the information does not comprise any GTP-U header, and the router attaches then the GTP-U header and routes the information to the UE.

Now the UE knows which local network devices it is authorised to use, and the authorisation policy is stored in the Authentication and Authorisation server.

However, before the UE is enabled to use one of the network printers of the WLAN, it has to obtain a LL-address of the network printer.

Figure 1C:
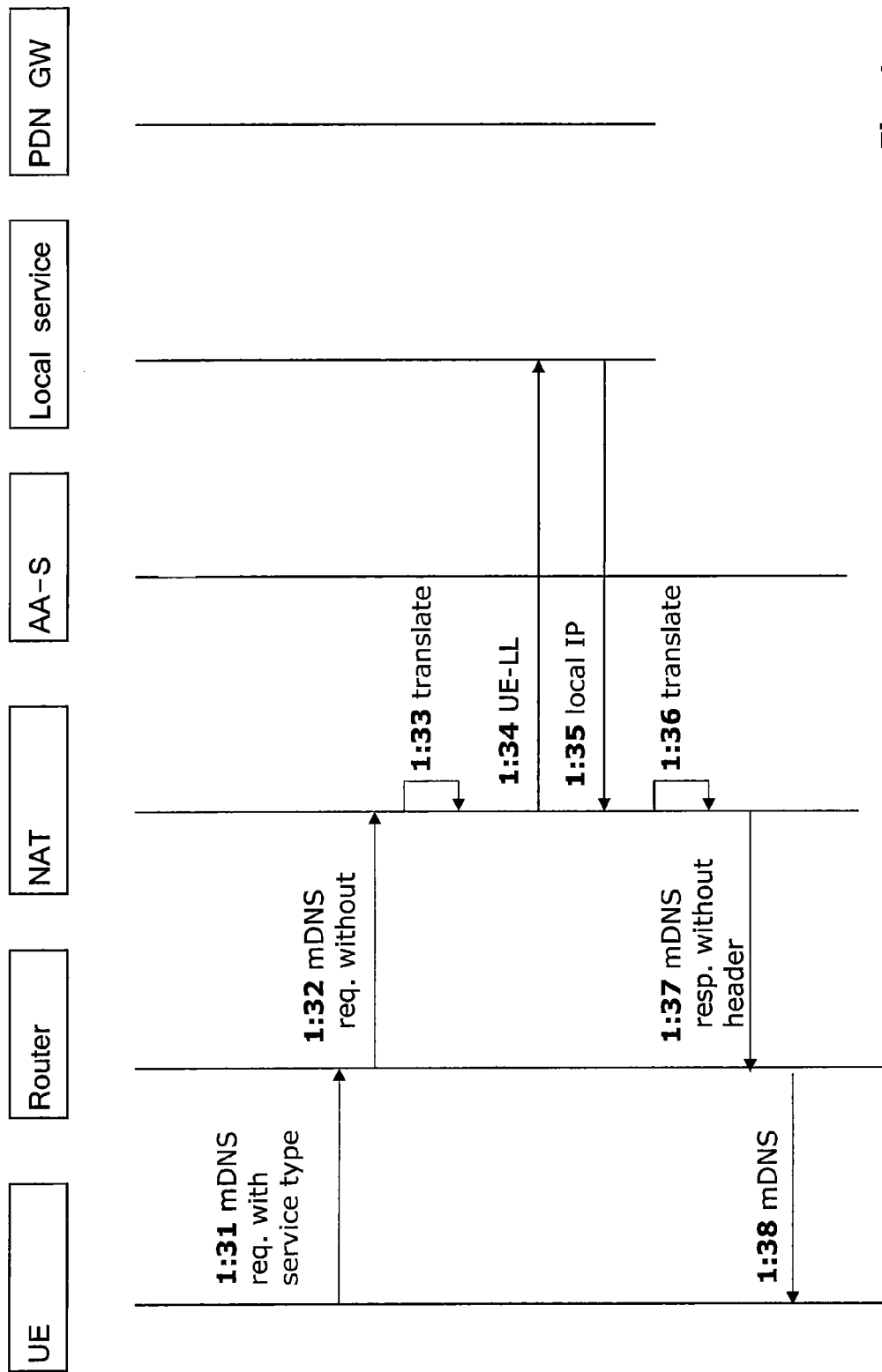

The FIG. 1c illustrates a third part of the scenario of accessing the network printer, i.e. a part where the UE will get information regarding local service devices which the UE is authorised to use.

In an action 1:31, because the domain name read in the action 1:3 ends with ".local", the UE sends the first part (http://quest-service.company.com) of the URL with an mDNS (multicast Domain Name Service) request into the GTP tunnel. The mDNS comprises information regarding which service type being required by the UE. In an action 1:32, the router which observes the traffic in the GTP tunnel identifies the mDNS request and routes it locally in the WLAN, which it controls. The router removes the GTP-U header of the IP-packets of the mDNS request and routes the mDNS request further to a NAT (Network Address Translator) of the router.

In another action 1:33, the NAT translates the UE's original IP-address into the UE's assigned LL-address. In a subsequent action 1:34 the UE's assigned LL-address is sent with an mDNS request regarding the required service type into the WLAN.

In a following action 1:35, local service devices according to requested type of service, answers the mDNS request with an mDNS response comprising the local IP-addresses of appropriate local service devices. It is to be noted that the mDNS also may comprise an appropriate port number of the local service devices, e.g. in accordance with TCP or UDP.

The NAT translates the local IP-address(es) into corresponding LL-address (es) of the local service device(s), in a following action 1:36, and sends the LL-address (es) of the local service device(s) to the router with an mDNS response, in a following action 1:37.

When the router receives mDNS response, in a following action 1:38, the mDNS response does not comprise any GTP-U header, and the router attaches then the GTP-U header and before routing the mDNS response to the UE.

Now the UE has received the LL-address(es) of appropriate local service device(s) to use, and will be able to send service data to one of the local service devices addressed to the corresponding LL-address.

Figure 1D:
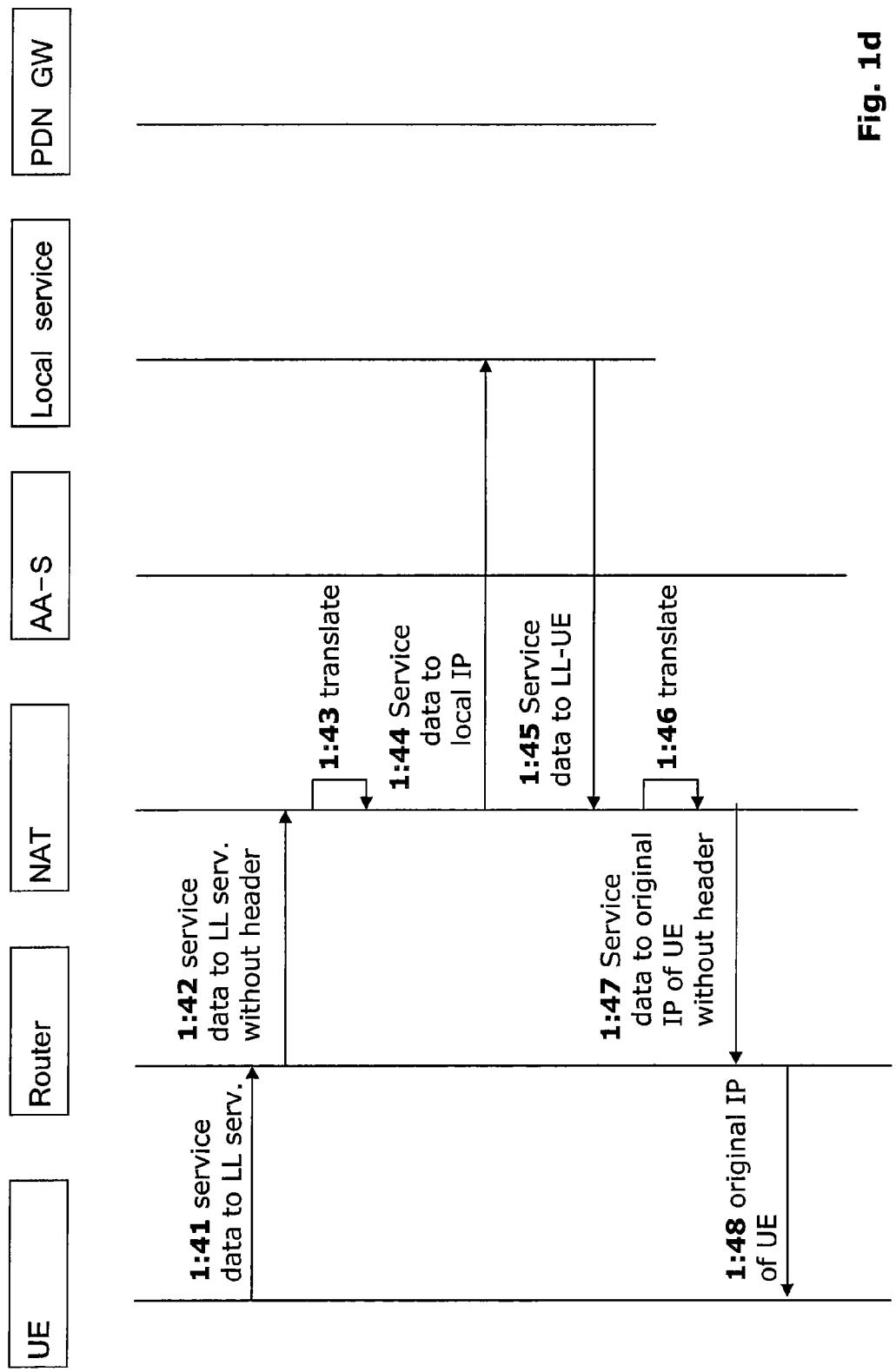

The FIG. 1d illustrates a fourth part of the scenario of accessing the network printer, i.e. a part where the UE will communicate service data with the local service device.

In an action 1:41, the UE sends service data for a local service device of the WLAN into the GTP tunnel addressed to the LL of the AA-S.

In another action 1:42, the router which observes the traffic in the GTP tunnel identifies LL-addressed IP-packets, i.e. the service data, and routes it locally in the WLAN. Correspondingly, to the action 1:5, the router further removes the GTP-U header of the IP-packets before routing them to the NAT (Network Address Translator) of the router.

Then, in another action 1:43, the NAT translates the LL-address of the local service device into the local IP-address of the local service device, and the IP-packets from the UE, i.e. the service data, are sent to the local service device, in another action 1:44. Thereby, the UE is enabled to get access to local service devices and send service data to them. For instance, the UE is enabled to get access to a local network printer and use the printer, i.e. send printer data.

In another exemplifying embodiment, which is based on the one above described embodiment, the UE making use of the local service device, will also receive service data from the local service device. Then in another action 1:45, the local service device sends service data addressed to the LL-address of the UE. The NAT translates the LL-address of the UE into the original IP-address of the UE, in a following action 1:46, and sends the service data without GTP-U header to the router in another action 1:47.

When the router receives the information, in a following action 1:48, the service data does not comprise any GTP-U header. The router attaches then the GTP-U header and routes the information to the UE.

It is to be noted that the described method is not limited to the above described exemplifying embodiments and may be alternatively implemented within the disclosed concept. For instance, a designer may select to implement the method in other types of local network, such as LANs (Local Area Network). Furthermore, he/she realises that the concept is not limited to UEs of communication networks, and could be applied in routers which connects local data or communication networks with operator controlled data or communication networks, where information is transported in IP-tunnels to operator gateways. Moreover, the concept is also valid for other types of wireless communication devices, such as communication terminals for Wi-Fi access only. For instance, a user of a tablet computer who visits a hot-spot at a café should not be able to use network printers when visiting. However, when implementing the described solution, he/she could by access to such a service for a limited time, or limited number of printouts from the owner of the café.

It is to be noted that the designer may implement the described method alternatively within the disclosed concept. In an alternative exemplifying embodiment, which is similar to the above described embodiment, the actions 1:8, 1:10 are instead performed by in accordance with Unicast DNS. In the action 1:8, the AA-S sends a Unicast response comprising the local IP-address AA-IP of the AA-S to the NAT addressed to the LL-address of the UE. In the action 1:10, the NAT further translates LL-address of the UE into the original IP-address of the UE before routing the Unicast DNS response to the UE.

Figure 2:
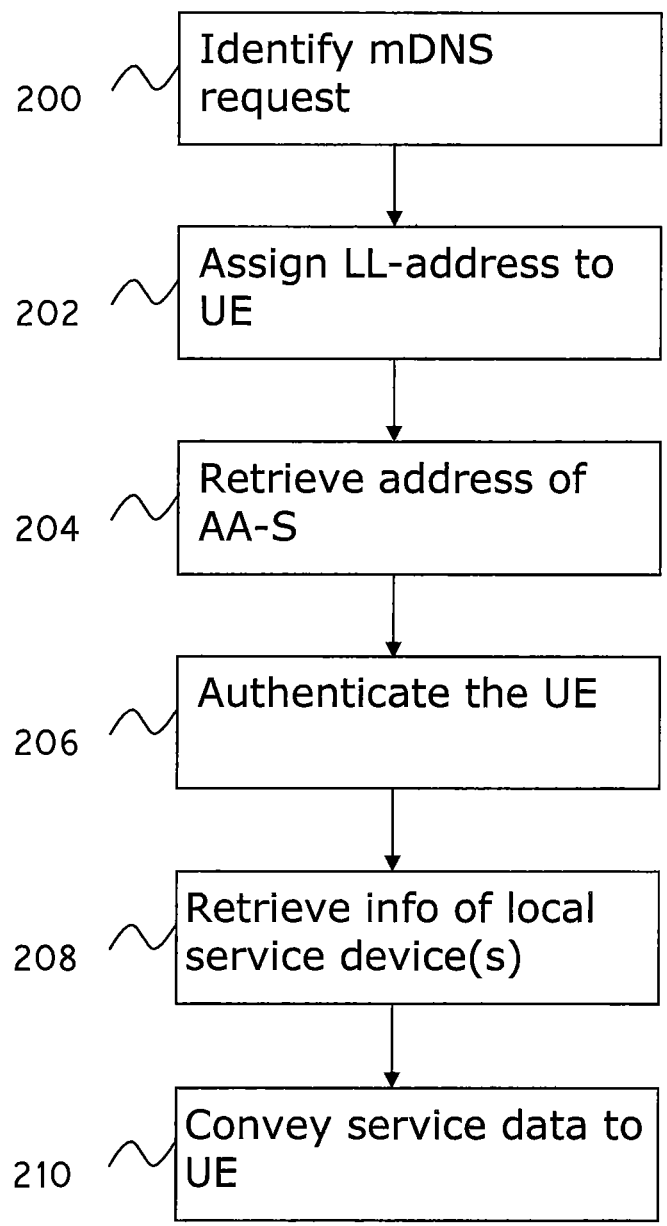
FIG. 2 is a schematic block diagram of a data retrieving unit, according to possible embodiments.

With reference to FIG. 2 (and further reference to the FIGS. 1a-d), which is a schematic flow chart, a method of enabling a wireless communication device to communicate with local service devices, such as network printers or projectors, of a LAN (Local Area Network) will now be described in accordance with one exemplifying embodiment. A router to which the wireless communication device is connected is further connected to both to a communication network and to the LAN.

When performing the method, in a first action 200, the router identifies an mDNS request from the communication device, wherein the mDNS request comprises a URL to an AA-S (Authorisation and Authentication Server) which comprises authorisation information regarding end users. This action corresponds to the action 1:4 of FIG. 1a, and will not be further discussed in this embodiment.

In another action 202, which corresponds to a first part of the action 1:6, the NAT assigns an LL-address to the UE in the WLAN.

In another action 204, which corresponds to the actions 1:5-1:11, the router retrieves an LL-address of the AA-S and presents to the UE.

In a following action 206, which corresponds to the actions 1:21-1:30, the router authenticates the UE, by determining which local services the UE is authorised to use in the WLAN.

Then in another action 208, which corresponds to the actions 1:31-1:38, the router retrieves LL-address(es) of appropriate local service devices, such that the UE will be enabled to convey service data with the local service devices according to the retrieved LL-address(es).

In a final action 210, which corresponds to the actions 1:41-1-48, the router conveys service data between the UE and the appropriate local service devices, by applying the retrieved LL-addresses.

Figure 3:
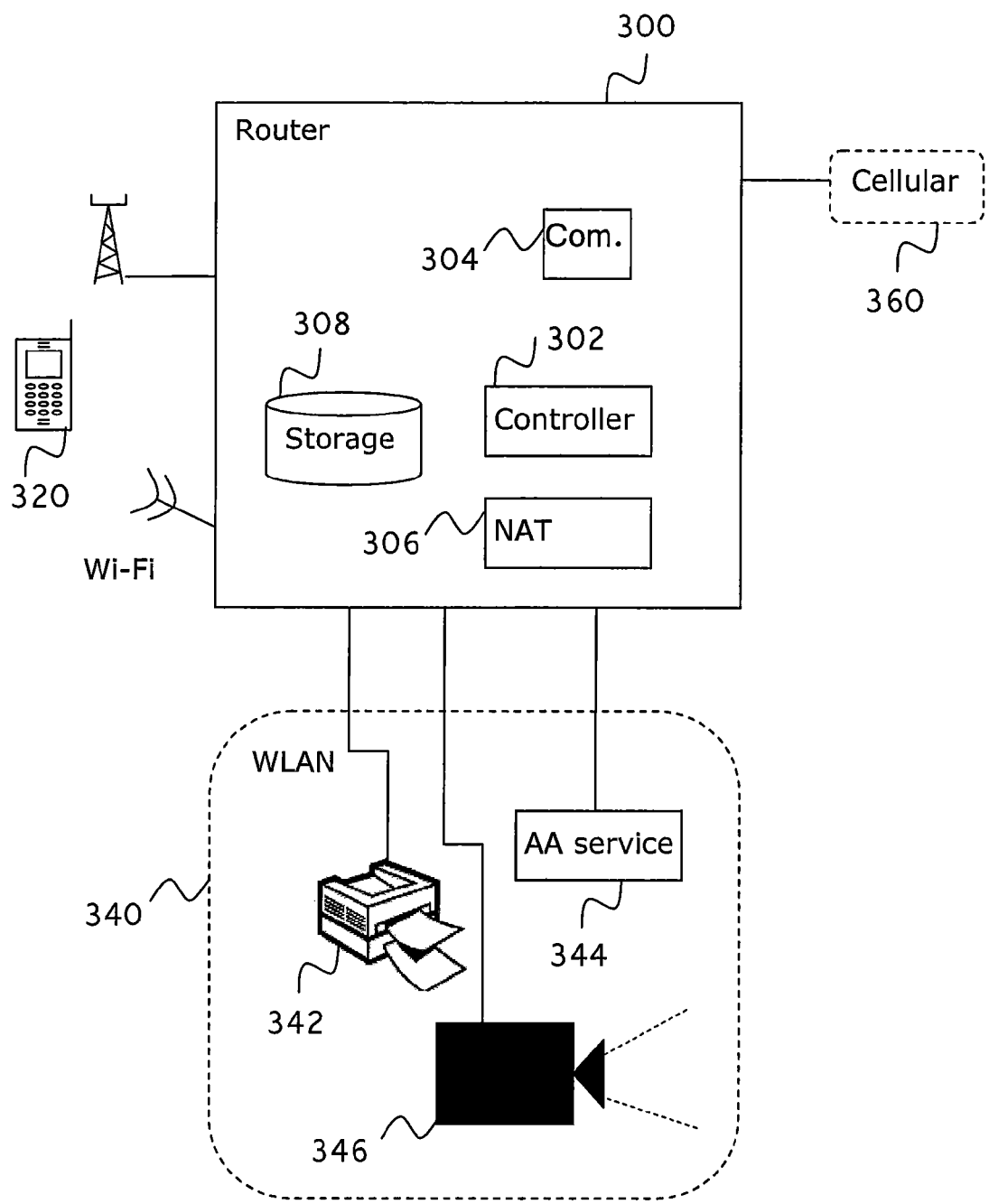
FIG. 3 is a schematic block diagram of a router, according to possible embodiments.

With reference to FIG. 3, which is a schematic block diagram, a communication network node will now be described, in accordance with one exemplifying embodiment.

In this embodiment, the communication network node is implemented as a router 300, which controls a WLAN (Wireless Local Area Network) 340. Furthermore, the router 300 conveys user data between a wireless communication device and a PDN-GW (Packet Data Network Gateway) 360 of an operator of a communication network to which the wireless communication device is a subscriber of. The wireless communication device is implemented as a UE (User Equipment) 320 and the communication network is a communication network. The UE 320 is connected by a RAN (Radio Access Network) (illustrated as an antenna) to the router 300 and conveys the user data in a tunnel to the PDN-GW 360.

The router 300 comprises a controller 302, and a communication module 304. The communication module 304 is arranged to convey data between the PDN-GW 360 and the UE 320 in the established IP tunnel, which is a GTP (General Packet Radio Service, GPRS, Transport Protocol) tunnel. The communication module 304 is further adapted to convey service data between the UE 320 and the WLAN 340.

The controller 302 is adapted to identify mDNS requests when being received from the UE 320, and assign a LL (LinkLocal) address for the UE 320 in the WLAN 340. The controller 302 is further adapted to retrieve a local IP-address of an AA-S (Authentication and Authorisation Service) 344 which has information regarding local service devices 342, 346 of the WLAN 340. The controller is further adapted to authenticate with the AA-S 344 which type of services that the UE 320 is authorised to use, retrieve local IP-addresses of the local service devices 342, 346, and convey service data between UE 320 and the local service devices 342, 346, by applying the LL-addresses of the local service devices 342, 346.

In an alternative exemplifying embodiment, which is based on the above described embodiment, the router 300 further comprises a NAT (Network Address Translator) 306. The NAT 306 is adapted to translate local IP-addresses of the WLAN into corresponding LL-addresses, and LL-addresses into corresponding LL-addresses. Furthermore, the NAT 306 is adapted to translate the original IP-address of the UE 320 into a corresponding LL-address in the WLAN 340. The controller 302 applies the NAT 306, when performing retrieval of information and conveying service data with the local service devices 342, 346, and the AA-S 344. Moreover, the router may further comprise a storage 308, in which the NAT 306 may store the LL-addresses, the original IP-address of the UE 320, etc.

In another exemplifying embodiment, which is related to some above described embodiments, the wireless communication device is connected to the router via a Wi-Fi instead of a RAN. The router 300 constitutes then an AP (Access Point) (illustrated as an antenna marked "Wi-Fi") for the wireless communication device. Commonly, operators offer increased capacity by so called hot-spots at locations where RANs of cellular communication networks have limited capacity.

Figure 4:
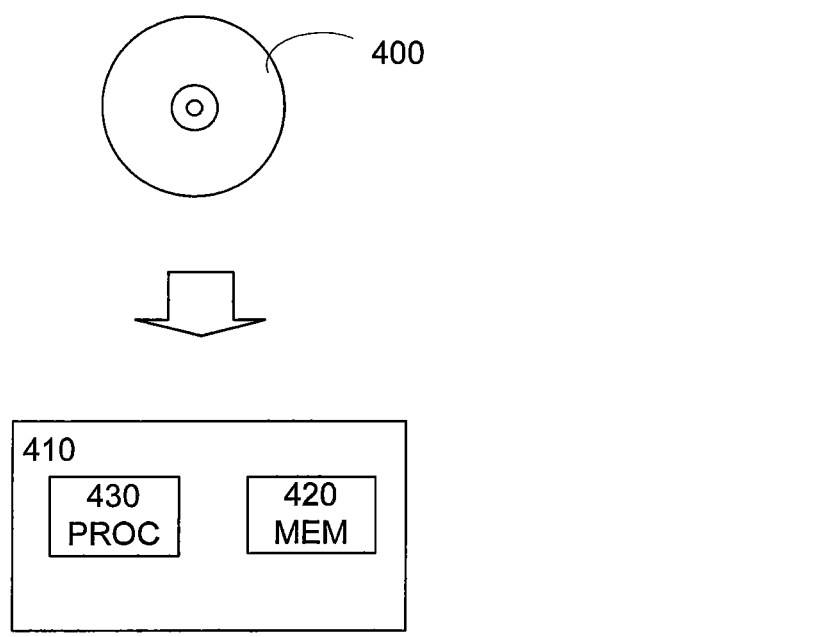
FIG. 4 is a schematic block diagram of a computer program product, according to possible embodiments.

According to some exemplifying embodiments, a computer program product comprises a computer readable medium such as, for example, a diskette or a CD-ROM as illustrated by 600 in FIG. 6. The computer readable medium may have stored thereon a computer program comprising program instructions. The computer program may be loadable into a data-processing unit 630, which may, for example, be comprised in a communication network node 610. When loaded into the data-processing unit 630, the computer program may be stored in a memory 620 associated with or integral to the data-processing unit 630. According to some embodiments, the computer program may, when loaded into and run by the data-processing unit 630, cause the data-processing unit 630 to execute method steps according to, for example, the methods shown in any of the FIGS. 3, and 4, respectively.

It is to be noted that the arrangements of the described exemplifying embodiments are described in a non-limiting manner. Typically, a designer may select to arrange further units and components to provide appropriate operation of the receivers, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a communication network node of enabling a wireless communication device to communicate with a local service device of a Local Area Network (LAN) or Wireless Local Area Network (WLAN) wherein the communication network node is connected both to the wireless communication device and to the LAN or WLAN, the method comprising:
   identifying a multicast Domain Name System (mDNS) request, the mDNS request being received from the wireless communication device;
   assigning a LinkLocal address (LL-address) for the wireless communication device;
   retrieving a local IP-address of an Authentication and Authorization Service (AA-S) having authorization information regarding the local service device;
   authenticating with the AA-S which type of services that the wireless communication device is authorized to use by routing information regarding the type of services between the wireless communication device and the AA-S;
   retrieving a local IP-address of the local service device;
   conveying service data between the wireless communication device and the local service device by applying the LL-address of the local service device;
   wherein the local service device comprises at least one of a printer and/or a projector,
   wherein the wireless communication device is connected to a communication network via a General packet radio Service Transport Protocol (GTP) tunnel;
   wherein the communication network node is arranged to observe traffic in the GTP tunnel;
   wherein retrieving the local IP-address of the AA-S comprises translating an original IP-address of the wireless communication device into the assigned LL-address of the wireless communication device, sending the assigned LL-address of the wireless communication device with an mDNS request to the AA-S, and receiving an mDNS response comprising the local IP-address of the AA-S in response to sending the mDNS request to the AA-S; and
   wherein applying the LL-address comprises identifying LL-addressed service data sent from the wireless communication device, translating the LL-address of the local service device into the local IP-address of the local service device, and sending the service data to the local service device addressed with the local IP-address of the local service device.

2. The method according to claim 1, wherein retrieving the local IP-address of the AA-S comprises translating the local IP-address of the AA-S into an LL-address of the AA-S, and sending the LL-address of the AA-S to the wireless communication device as an mDNS response.

3. The method according to claim 1, wherein retrieving the local IP-address of the AA-S comprises translating the local IP-address of the AA-S into an LL-address of the AA-S, translating the LL-address of the wireless communication device to the original IP address of the wireless communication device, and sending the LL-address of the AA-S to the wireless communication device as a Unicast DNS response.

4. The method according to claim 1, wherein the authenticating with the AA-S comprises receiving and forwarding authorization information for the wireless communication device, the authorization information being created by the wireless communication device.

5. The method according to claim 4, wherein the authorization information is addressed to the LL-address of the AA-S and the authenticating further comprises translating the LL address of the AA-S to the local IP-address of the AA-S, to define an authorization policy in the AA-S for the wireless communication device based on the authorization information, receiving information regarding an authorized local service device addressed to the LL-address of the wireless communication device, and forwarding the information regarding the authorized local service device to the wireless communication device.

6. The method according to claim 5, wherein retrieving the local IP-address of the local service device comprises identifying a multicast Domain Name System (mDNS) request for a local service device, translating the original IP-address of the wireless communication device into the LL-address of the wireless communication device, forwarding the mDNS request to the local service device, receiving the local IP-address of the local service device, translating the local IP-address of the local service device into an LL-address of the local service device, and sending the LL-address of the local service device to the wireless communication device as an mDNS response.

7. A communication network node, adapted to enable a wireless communication device to communicate with a local service device of a Local Area Network (LAN) or Wireless Local Area Network (WLAN) wherein the communication network node is connected both to the wireless communication device and to the LAN or WLAN, the communication network node comprising a controller, and a communication module, wherein:
 the communication module is configured to perform operations comprising:
  conveying data between a wireless communication device and a gateway of a communication network;
  conveying service data between the wireless communication device and the LAN or WLAN; and
 the controller is configured to perform operations comprising:
  identifying a Multicast Domain Name System (mDNS) request when received from the wireless communication device;
  assigning a LinkLocal address (LL-address) for the wireless communication device;
  retrieving a local IP-address of an Authentication and Authorization Service (AA-S) having authorization information regarding the local service device;
  authenticating with the AA-S which type of services that the wireless communication device is authorized to use by routing information regarding the type of services between the wireless communication device and the AA-S;
  retrieving a local IP-address of the local service device;
  conveying service data between wireless communication device and the local service device, by applying the LL-address of the local service device; and
 wherein the local service device comprises at least one of a printer and/or a projector;
 wherein the wireless communication device is connected to a communication network via a General packet radio Service Transport Protocol (GTP) tunnel;
 wherein the communication network node is arranged to observe traffic in the GTP tunnel;
 wherein retrieving the local IP-address of the AA-S comprises translating an original IP-address of the wireless communication device into the assigned LL-address of the wireless communication device and sending the assigned LL-address of the wireless communication device with an mDNS request to the AA-S, and receiving an mDNS response comprising the local IP-address of the AA-S in response to sending the mDNS request to the AA-S; and; and
 wherein applying the LL-address comprises identifying LL-addressed service data sent from the wireless communication device, translating the LL-address of the local service device into the local IP-address of the local service device, and sending the service data to the local service device addressed with the local IP-address of the local service device.

8. The communication network node according to claim 7, further comprising a Network Address Translator (NAT) configured to perform operations comprising:
 translating the local IP-address of the AA-S into an LL-address of the AA-S;
 translating the LL-address of the AA-S into the local IP-address of the AA-S;
 translating the local IP-address of the local service device into an LL-address of the local service device;
 wherein translating the LL-address of the local service device into the local IP-address of the local service device is performed by the NAT;
 wherein translating the original IP-address of the wireless communication device into an LL-address of the wireless communication device is performed by the NAT; and
 translating the LL-address of the wireless communication device into the original IP-address of the wireless communication device.

9. The communication network node according to claim 7, wherein the controller is further configured to perform operations comprising:
 removing General Packet Radio Service (GPRS) Transport Protocol (GTP) User (GTP-U) headers from received mDNS requests and service data before being forwarded to the respective one of the AA-S and the local service device, and
 attaching GTP-U headers to mDNS responses and service data before being forwarded to the wireless communication device.

10. A computer program product comprising a non-transitory computer readable medium storing a computer program comprising program instructions, the computer program when executed by a data-processing unit causes the data-processing unit to perform the method according to claim 1.

11. The communication network node according to claim 7, further comprising a Network Address Translator (NAT), wherein the controller is further configured to perform operations comprising:

retrieving the local IP-address of the AA-S by transmitting a request to the NAT;
wherein the NAT is configured to perform operations comprising:
wherein translating the original IP-address of the wireless communication device into the LL-address of the wireless communication device is performed by the NAT;
forwarding the mDNS request to the AA-S;
receiving the local IP-address of the AA-S;
translating the local IP-address of the AA-S into an LL-address of the AA-S;
sending the LL-address of the AA-S to the controller; and
wherein the controller is further configured to perform operations comprising:
sending the LL-address of the AA-S to the wireless device as an mDNS response.

12. The communication network node according to claim 7, further comprising a Network Address Translator (NAT), wherein the controller is further configured to perform operations comprising:
retrieving the local IP-address of the AA-S by transmitting a request to the NAT
wherein the NAT is configured to perform operations comprising:
wherein translating the original IP-address of the wireless communication device into the LL-address of the wireless communication device is performed by the NAT;
forwarding the mDNS request to the AA-S;
receiving the local IP-address of the AA-S;
translating the local IP-address of the AA-S into an LL-address of the AA-S;
translating the LL-address of the wireless communication device to the original IP address of the wireless communication device; and
sending the LL-address of the AA-S to the wireless communication device; and
wherein the controller is further configured to perform operations comprising:
sending the LL-address of the AA-S to the wireless device as a Unicast DNS response.

13. The communication network node according to claim 7, wherein the controller is further configured to perform operations comprising:
authenticating by receiving and forwarding authorization information for the wireless communication device, the authorization information being created by the wireless communication device.

14. The communication network node according to claim 13, further comprising a Network Address Translator (NAT), wherein the authorization information is addressed to the LL-address of the AA-S, wherein the NAT is configured to perform operations comprising:
translating the LL address of the AA-S to the local IP-address of the AA-S,
receiving authorization information regarding an authorization policy from the AA-S for the wireless communication device; and
wherein the controller is further configured to perform operations comprising:
receiving information regarding an authorized local service device addressed to the LL-address of the wireless communication device, and
forwarding the information regarding the authorized local service device to the wireless communication device.

15. The communication network node according to claim 14, further comprising a Network Address Translator (NAT), wherein the controller is further configured to perform operations comprising:
retrieving the local IP-address of the local service device by identifying a multicast Domain Name System mDNS request for a local service device;
wherein the NAT is configured to perform operations comprising:
wherein translating an original IP-address of the wireless communication device into the LL-address of the wireless communication device is performed by the NAT;
forwarding the mDNS request to the local service device;
receiving the local IP-address of the local service device;
translating the local IP-address of the local service device into an LL-address of the local service device; and
sending the LL-address of the local service device to the controller; and
wherein the controller is further adapted to:
sending the LL-address of the local service device to the wireless communication device as an mDNS response.

16. The communication network node according to claim 15, wherein the controller is configured to perform operations comprising:
conveying service data by sending the service data to the NAT;
wherein the NAT is further configured to perform operations comprising:
wherein translating the LL-address of the local service device to the local IP-address of the local service device is performed by the NAT; and
forwarding service data addressed to the LL-address of the local service device, to the local IP-address of the local service device.

17. The method according to claim 1, further comprising:
translating the local IP-address of the AA-S into an LL-address of the AA-S;
translating the LL-address of the AA-S into the local IP-address of the AA-S;
translating the local IP-address of the local service device into an LL-address of the local service device; and
translating the LL-address of the wireless communication device into the original IP-address of the wireless communication device.

18. The method according to claim 1, further comprising:
removing a General Packet Radio Service (GPRS) Transport Protocol (GTP) User (GTP-U) header from the mDNS request received from the wireless communication device before forwarding the mDNS request to the AA-S;
attaching a GTP-U header to an mDNS response including the LL-address of the AA-S that is sent to the wireless communication device;
removing a GTP-U header from service data before conveying the service data from the wireless communication device to the local service device; and
attaching a GTP-U header to service data that is forwarded from the local service device to the wireless communication device.

19. The method according to claim 1, wherein the mDNS request comprises a universal resource locator (URL) identifying the AA-S having authorization information regarding the local service device.

20. The method according to claim 19, wherein the URL comprises only a domain name identifying the AA-S having authorization information regarding the local service device.

21. The method according to claim 1, wherein the mDNS response comprises a port number of the AA-S.

* * * * *